Nov. 6, 1928.
B. P. REMY
1,690,248
ELECTRIC GENERATOR
Filed May 29, 1926
2 Sheets-Sheet 1
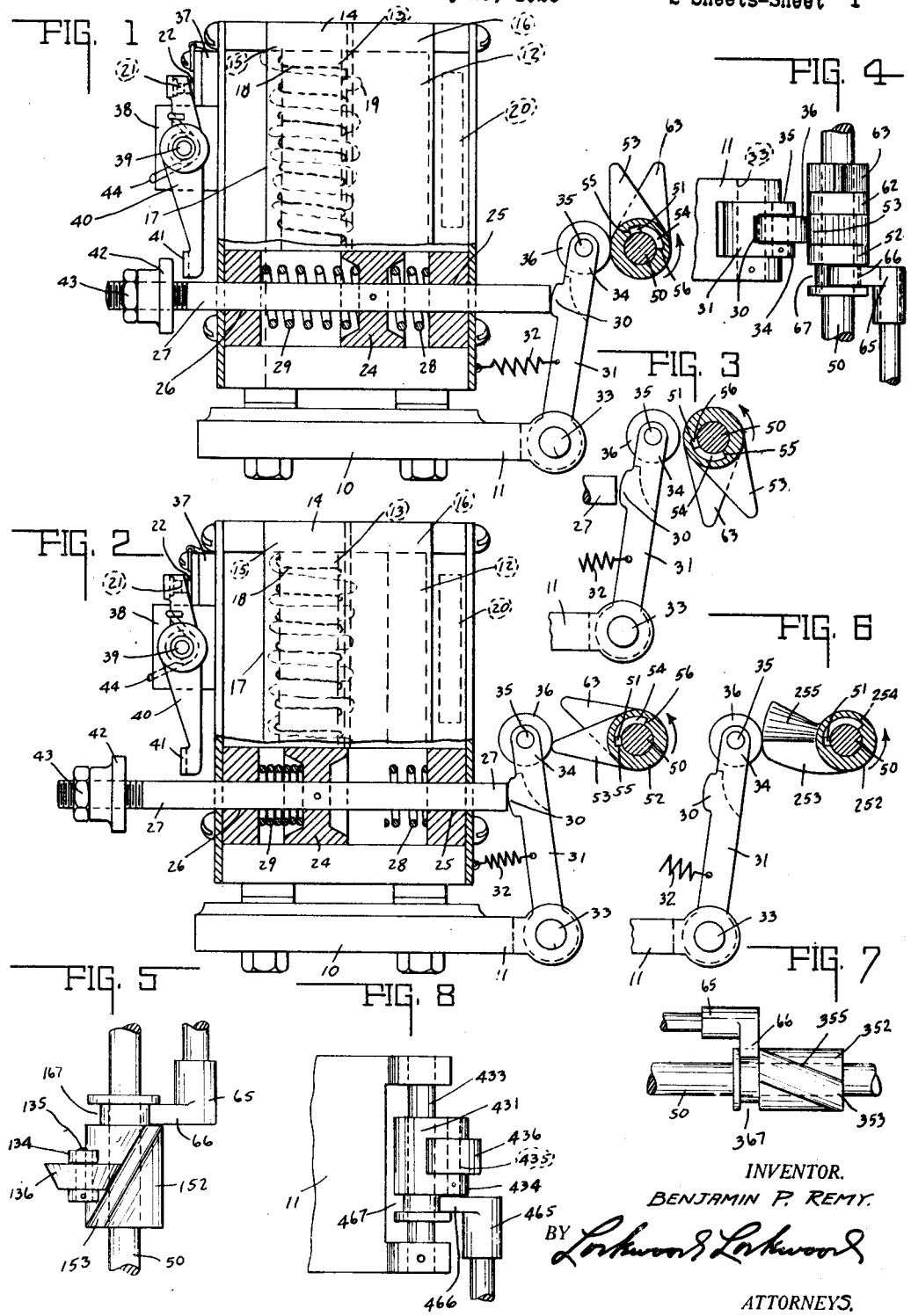
INVENTOR.
BENJAMIN P. REMY.
BY Lockwood & Lockwood
ATTORNEYS.

Nov. 6, 1928.                B. P. REMY                1,690,248
                          ELECTRIC GENERATOR
                          Filed May 29, 1926            2 Sheets-Sheet 2
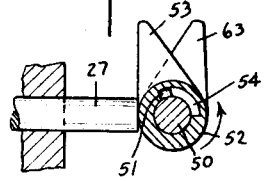
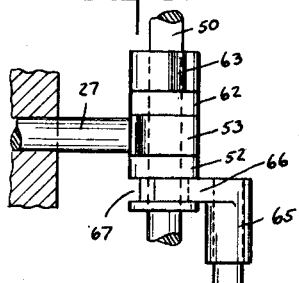
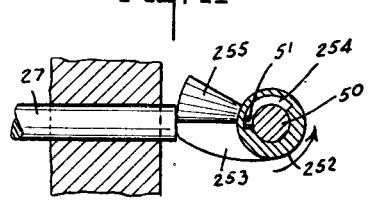
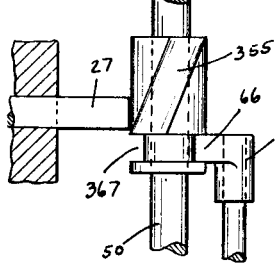
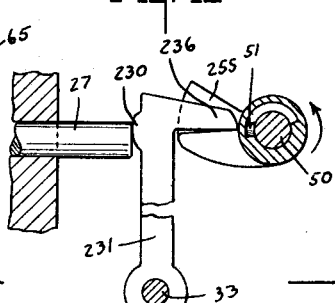
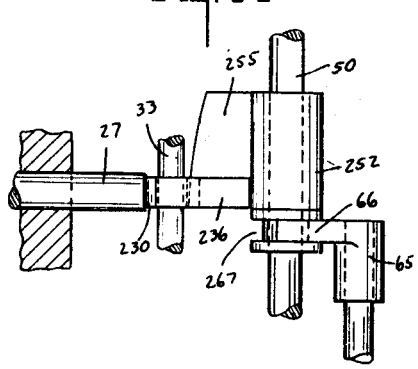
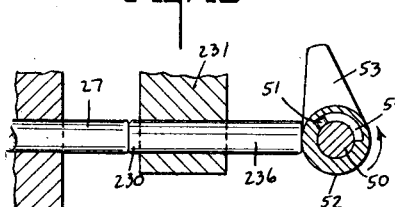
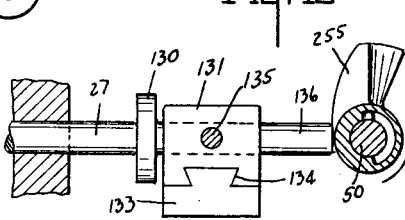
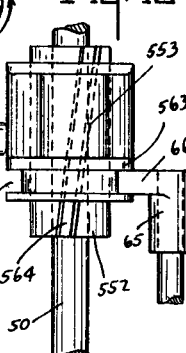
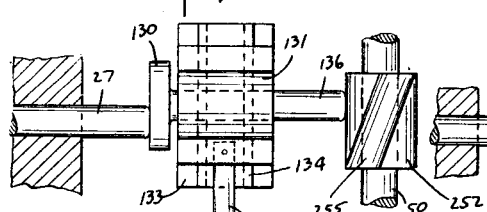
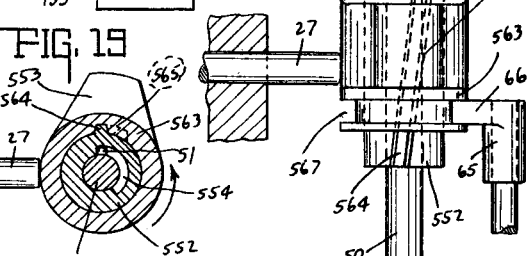
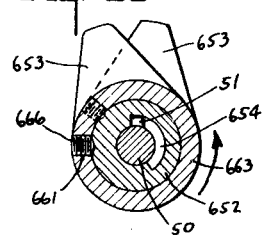
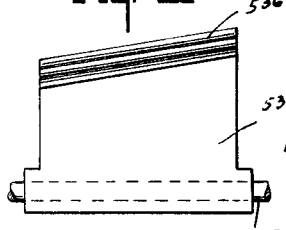
INVENTOR.
BENJAMIN P. REMY.
BY Lockwood Lockwood
ATTORNEYS.

Patented Nov. 6, 1928.

1,690,248

UNITED STATES PATENT OFFICE.

BENJAMIN P. REMY, OF INDIANAPOLIS, INDIANA.

ELECTRIC GENERATOR.

Application filed May 29, 1926. Serial No. 112,494.

This invention relates to a reciprocating electric generator wherein there is formed a plurality of magnetic paths positioned in substantially parallel relation and a to and fro movable path forming element shiftable from alignment with one of the parallel paths to the other, whereby the flux is substantially shifted from one path to the other, thereby generating the desired electromotive force in a winding associated with a magnetic path.

The chief object of the invention is to provide a to and fro movable magnetic path forming element and means for shifting the same at different relative times with respect to the power supplying mechanism, whereby the electromotive force is generated at relatively different times with respect to predetermined positions of the power mechanism whereby timing of the same, for example, ignition control in an internal combustion engine, is obtained.

The chief feature of the invention consists in the adjustable timing driving connection between the power source and the to and fro movable magnetic path forming element.

The full nature of the invention will be understood from the accompanying drawings and the following description and claims:

Fig. 1 is a side elevational view of a reciprocatory electric generator of the magneto type, parts being broken away showing other parts in section and in detail, the reciprocator being shown in the extreme retracted position and the actuating mechanism being shown in non-retracting position. Fig. 2 is a similar view of the same parts showing the same in the opposite extreme position with the actuating parts in the actuating position and immediately prior to the retraction. Fig. 3 shows the operative parts immediately following retraction. Fig. 4 is a top plan view of said parts illustrating the position thereof in Fig. 1. Fig. 5 is a view similar to Fig. 4 and of a modified form of the invention. Fig. 6 is a view similar to Fig. 3 of a modified form of the invention but with the parts shown in the position corresponding to that illustrated in Fig. 2. Fig. 7 is a side elevational view thereof. Fig. 8 is a top plan view of still a further modified form of the invention. Fig. 9 is a side elevation of parts in section of a direct and multiple contact actuation. Fig. 10 is a plan view thereof. Fig. 11 is an elevation with parts in section of a direct contact scroll cam. Fig. 12 is a plan view of a direct contact spiral cam. Fig. 13 is an elevation of parts in section of a modified scroll cam. Fig. 14 is a top plan view thereof. Fig. 15 is an elevation of a modified form including a slidable shifting follower. Fig. 16 is a similar view of a sliding scroll cam contact. Fig. 17 is a top plan view of a spiral cam sliding contact. Fig. 18 is a top plan view of a spiral shiftable cam contact. Fig. 19 is a transverse sectional view thereof. Fig. 20 is a central sectional view of an adjustable form of cam mounting. Fig. 21 is a top plan view of a modified form of intermediate actuator.

Before proceeding to a detailed description of the to and fro movable mechanism and the actuation thereof, a short descriptive résumé of the type of generator and parts thereof will be given.

In the drawings 10 indicates a base having a projecting portion 11, said base being suitably mounted upon an internal combustion engine. The magneto includes a magnetic conducting member 12 and a similar member 13 joined by a similar member 14 at its upper ends. The lower ends have a common plane or terminate alike. The bar magnets 15 and 16 extend from the top to the bottom of the magneto at the sides and are mechanically retained in position by a strap 17. Each of the magnetic conducting elements 12 and 13 alternately comprises the central and common path of the magnetic circuit including all of the magnets.

Herein the magneto includes a primary winding 18 shown wound upon the common magnetic path member 13. Also wound upon this member is a secondary winding 19. The primary winding 18 is connected in parallel to the condenser 20 and is short circuited by a circuit breaker having the contacts 21 and 22. The secondary winding 19 terminates in the usual spark gap or spark plug and may be suitably connected thereto, said spark plug or spark gap being included in the engine or power mechanism and igniting the explosive mixture therein. Each of the magnetic path forming members 12 and 13 provide pole faces and a magnetic core or inductor 24 completes the magnetic circuit for each of the paths 13 and 14. By shifting the inductor or reciprocator from the position shown in Fig. 1 to the positon shown in Fig. 2 and vice-versa, the magneto will generate an electromotive force. This is because it varies the reluctance of the several paths by moving from one pole face to the other and carrying the flux therewith so as to change the magnetic distribution in the electrical generator, which changes result in the generation of the electromotive force.

In the stator of the generator a pair of aligned openings 25 and 26 are provided in which is mounted a reciprocatory rod 27 secured to which is the inductor or flux shifter 24 included in the magnetic paths. A spring 28 is concentric with the stem 27 and is adapted to be compressed, thereby cushioning the travel of the reciprocator to the right. A spring 29 is concentric with the stem 27 and positioned upon the opposite side of the reciprocator and is compressed in the movement of the stem to the left and cushions said movement of the reciprocator to the left in its extreme position. When the stem is released from its actuating force, to which reference will be had hereinafter, the spring 29 opposes the power means and moves the reciprocator to the right, thus shifting the inductor's position from one magnetic path to another.

The means for recprocating the stem 27 comprises an abutment 30 carried by a pivotally supported member 31 maintained in engageable position by a spring 32, said lever 31 being pivotally mounted upon shaft 33 supported by bracket 11. The lever 31 terminates in a pair of ears 34 and thereby forms a fork in which is mounted a pin 35 rotatably supporting roller 36. When the roller 36 is actuated to tilt lever 31 on its pivot, stem 27 is reciprocated or moved to the left, and when the constraining or actuating force is removed spring 29 moves all of the parts to the right. However, in a bracket 38 carried by the magneto and pivotally supported upon the shaft 39 thereby is the lever 40 which carries one of the contacts, to wit, contact 32 of the circuit breaker. The other contact 31 is stationarily mounted in said bracket 38 at 37. The lever 40 has a contact portion or projecting end 41 engageable by the adjustably mounted collar 42 secured in adjusted position by the lock nut 43 on the threaded end of the stem 27. Thus, when the stem is projected to the right by the spring 29 through the release or removal of the constraining force moving or positioning said stem toward the left, the lever 40 is tilted counter-clockwise to open the circuit controlled by the resultant circuit breaker. The spring 44 serves to maintain the circuit in closed circuit position until such time as it is positively actuated and opened by the stem 27 and thus operates in timed relation with the movement of the inductor.

Transverse to the reciprocatory or plane of to and fro movement is a power shaft 50 having a spline or key 51 projecting therefrom. Mounted on said power shaft is a hub or collar 52 carrying a projecting cam 53. The hub or collar 52 has an elongated arcuate recess 54 in which the pin 51 rides. Thus, in counter-clockwise rotation of shaft 50, pin 51 engages the wall for starting and for normal load. Therefore, a construction which is timed for two different positions is adequate for all practical purposes, although if desired adjustability or variations in the timing may be secured through the entire range desired. After actuation the cam slips to the position shown in Fig. 3.

A second cam 63, see Figs. 1 to 4, has the collar portion 62 and includes a similar slot and pin arrangement upon the shaft 50. The two cams 52 and 62 are connected together and shiftable longitudinally upon shaft 50 through yoke shifter 65 having arms 66 seatable in groove 67 formed in the collar 52. When the cam 53 is positioned in alignment with roller 36 and stem 27, the spark desired will be generated in advance of that generated when the mechanism is actuated through the cam 63, the direction of rotation being counter-clockwise for the shaft 50.

The shaft 50, see Fig. 5, includes a cylindrical cam body 152 having the groove 167 receiving arms 66 of yoke 65. The cam portion 153 is inclined or spiralled. The lever having ears 134 supports pin 135 mounting a bevelled cam roller 136, which is engaged by cam 153 at all times. Relief for quick return movement may be secured by providing an arcuate slot and radial pin connection 51, 54, 55 and 56. The range of adjustment or timing of the spark ranges from the initial engagement with the lower forward portion of the cam surface 153 as shown in Fig. 5, to the upper back portion as shown in the same figure.

The lever 30, Fig. 6, mounts roller 36 which engages a spiral cam mounted on shaft 50 carrying pin 51. The cam sleeve portion 252 has the arcuate slot 254 and supports the cam portion 253 having an inclined surface 255. Cam 252 includes the shafting groove 267 receiving arms 66 of yoke 65 for longitudinal cam movement. The helical cam 352 has the yoke receiving groove 367 and the projecting portion 353 terminating in the cam surface 355, see Fig. 7.

In the foregoing types roller 36 or 136, is not shifted longitudinally with respect to shaft 50, but the cam is shifted with respect to both.

When the follower is to be shifted see Fig. 8 the base 11 supports the elongated shaft 433 which rotatably and slidably supports link or lever 431. Ears 434 thereof mount pin 435 and roller 436. Link 431 is shifted longitudinally on its pivotal support 433 by yoke shifter 465 having arms 466 receivable by groove 467 of the lever 431. To insure contact of the usual rod 27 the abutment 30 is elongated transversely so as to be always engageable therewith whatever is the position of roller 436.

A comparison of Figs. 9 and 10 with 1 to 4 inclusive, illustrates the elimination of the intermediate connection or cam follower and the direct drive of the rod 27 by the cam 52 or 53 and shiftable arrangement whereby the cam is caused to engage rod 27. The parts are similarly numbered.

Figs. 11 and 12 are similar to Figs. 6 and 7, respectfully in that they show the direct engagement of the scroll and spiral cams with the rods 27 and the omission of the intermediate contactor or follower. The parts are similarly numbered.

Figs. 13 and 14 show the link 231 tiltably supported on pivot 33 and including the rod engaging abutment 230 and cam engaging portion 236, the same being substituted for the link or lever shown in Figs. 1 to 4 inclusive. This modification is associated with the scroll type of cam.

A simple form of the invention see Fig. 15 comparable to that shown in Fig. 1, includes the support 231 slidably supporting the rod 236 having a projecting end 230 for engagement with rod 27. The opposite end of rod 236 engages the tiltably mounted roller. Modified forms of this simplification are illustrated in Figs. 16 and 17 and the aforesaid rod 136 is interposed between the rod 27 and the actuating cam. Fig. 16 shows the scroll type of cam and Fig. 17 the spiral type cam. Parts are numbered corresponding to that in Figs. 6 and 7. The interposed sliding connection includes the abutment 130 carried by the sliding stem 136 engaged by the cam. The support 131 which slidably supports the same is in turn slidably supported upon member 133 and the actuating portion 135 secures the sliding movement. The size of the abutment 130 is sufficient to always engage stem 27 and engage the adjacent cam portion. With this form of the invention the follower is slidable longitudinally of the shaft axis and cam and follower have relative sliding movement, and the movable member of the pair is movable transversely of the to and fro movement of the rod 27.

The more complicated construction includes a sleeve 552 (see Figs. 18 and 19) having the slip relief connection previously described, and incorporated in all of the cam mountings and a spiral tongue 564 which is receivable by spiral groove 565 formed in the collar portion 563 of cam 553. Collar portion 563 includes groove 567 receiving arms 66 of yoke shifter 65, whereby shifting axially (on shaft 50) of collar 563 on sleeve 552 secures adjustability of the cam 553 with respect to rod 27.

Another modified form and a simple one, is shown in Fig. 20, wherein the sleeve 652 has a slip relief connection set forth, and mounted thereon is the collar 663 including the cam 653, said collar being secured to said sleeve by the set screw 666 receivable in the threaded opening 661 of said collar.

A modified form of intermediate actuator 531, see Fig. 21 and comparable to lever 31, Fig. 1, has the inclined surface 536 engageable by a single cam. The supporting pivot is rod 433 comparable to pivot 33, Fig. 1. Either the cam or the actuator can be shifted longitudinally of the rotary power axis. This shifting varies the timing and the modification is somewhat similar to that shown in Fig. 5.

The invention claimed is:

1. In a magneto, the combination of a magnetic path forming member having to and fro movement, a spring normally moving said member in one direction, a rotating shaft, cam means operable thereby for moving the member in the opposite direction and including a plurality of angularly offset portions for timing variation, means for causing a predetermined cam portion to actuate said path forming member, and a slip relief driving connection interposed between said rotating shaft and the cam means for permitting quick return of the path forming member.

2. In a magneto, the combination of a magnetic path forming member having to and fro movement, a rotating shaft, cam means operable thereby and including a plurality of portions angularly offset from each other for selective timing actuation, and means interposed between said path forming member and said cam means and actuatable by the latter for causing movement of the path forming member in one direction.

3. A device as defined by claim 2, characterized by said interposed means having an irregular portion, said cam means and interposed means having relative movement therebetween for adjustable contact therebetween.

4. A device as defined by claim 2, characterized by said interposed means having an irregular portion, said cam means and interposed means having relative movement therebetween for adjustable contact therebetween, and said relative movement occurring parallel to the shaft axis for said adjustability.

5. A device as defined by claim 2, characterized by the addition of a slip relief driving connection interposed between said cam means and said rotating shaft permitting quick return of the path forming member.

6. A device as defined by claim 2, characterized by said interposed means and having an irregular portion, said cam means and interposed means having relative movement therebetween for adjustable contact therebetween, and further characterized by the addition of a slip relief driving connection interposed between said cam means and said rotating shaft permitting quick return of the path forming member.

7. A device as defined by claim 2, characterized by said interposed means having an irregular portion, said cam means and interposed means having relative movement therebetween for adjustable contact therebetween, and said relative movement occurring parallel to the shaft axis for said adjustability, and being further characterized by the addition of slip relief driving connection interposed between said cam means and said rotating shaft permitting quick return of the path forming member.

8. A device as defined by claim 2, characterized by said interposed means having an irregular portion and said interposed means being mounted for movement in two transverse planes, one of which lies parallel to the shaft axis and the other of which is transverse thereto.

In witness whereof I have hereunto affixed my signature.

BENJAMIN P. REMY.